Aug. 21, 1962 W. L. MIKELL 3,050,311
SOLID RING FLOATING PACKING
Filed Nov. 23, 1960

INVENTOR.
WINBORN L. MIKELL
BY John P. Murphy
ATTORNEY

United States Patent Office 3,050,311
Patented Aug. 21, 1962

3,050,311
SOLID RING FLOATING PACKING
Winborn L. Mikell, Houston, Tex., assignor to Garlock,
Inc., Palmyra, N.Y., a corporation of New York
Filed Nov. 23, 1960, Ser. No. 71,280
5 Claims. (Cl. 277—157)

The invention relates to mechanical packings, and particularly mechanical packings for sealing parts undergoing relative motion in environments of high fluid pressures.

In many industries, there exists a need for rigid elements such as packing rings for inclusion in the wall of a container bearing fluids, such as liquid or gas, and designed to prevent or minimize leakage between the rigid parts of such a container. Where the rigid parts of a container are capable of relative motion, the packing is required to be in sliding contact with one or more parts of the container. Examples of such moving parts are piston rods, valve stems, plungers, moving shafts, etc. As fluid pressures are increased, greater demands are placed on the packing to insure intimate sealing contact with the moving parts. Prior art packing devices have proved to be essentially ineffective with respect to wear at pressures above 15,000 pounds per square inch. In general, excessive heating due to friction is developed at the points of intimate contact with consequent destruction of the packing, thereby necessitating high packing replacement costs, increased down time of equipment to permit packing replacement, etc.

It is therefore an object of this invention to provide an improved mechanical packing for sealing parts undergoing relative motion.

It is another object of this invention to provide an improved mechanical packing capable of operating at higher pressures.

It is a further object of this invention to provide an improved mechanical packing capable of effectively sealing under conditions of variable pressure.

It is another object of this invention to provide an improved packing which automatically adjusts to varying sealing requirements.

While the novel and distinctive features of the invention are particularly pointed out in the appended claims, a more expository treatment of the invention, in principle and in detail, together with additional objects and advantages thereof, is afforded by the following description and accompanying drawings in which:

In FIG. 1 illustrates in longitudinal section form, a section of a packing box embodying my arrangement for mechanical packings;

In FIG. 2 illustrates schematically the manner in which the various packing rings of a packing set are designed to intimately contact the moving rod or piston;

Figure 1:
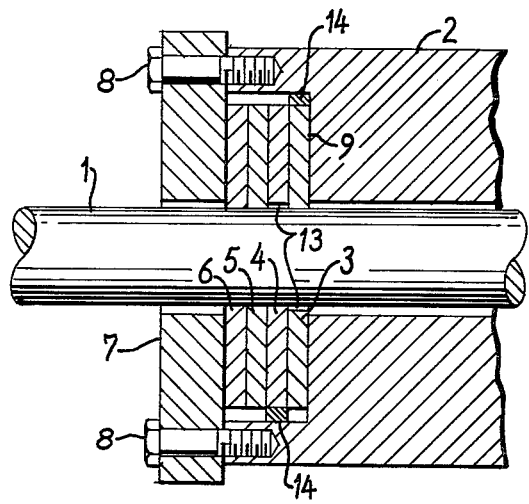

Referring to FIG. 1, there is shown in longitudinal section, a packing box having an arrangement of packing rings, embodying the present invention.

The piston rod 1 passes through an opening in the packing box 2. To prevent fluids under high pressures which are contained in a vessel located to the right of the packing box from passing through the openings between the rod and the stuffing box, there has been provided a set of packing rings, 3–6. These packing rings, to be described hereinafter, have inner surfaces of sufficient diameter to pass over the piston rod 1. The rings are assembled in an annular recess or channel formed at the left hand side of the stuffing box. The gland 7 is provided for holding the rings in the channel formed in the stuffing box. The gland is secured to the stuffing box by means such as bolts 8. Normally, fluid escaping through the opening between the piston rod 1 and the stuffing box 2 acts along the front wall 9 of the stuffing box tending to drive the set of packing rings 3–6 axially against the gland 7. Additionally, some fluid escaping along the rod or shaft tends to drive the packing rings radially outward. Normally, this radial outward force tends to break the sealing action sought by use of packing rings.

The floating metal packings now in common usage, trap fluid pressure in the ocean of the stuffing box partially occupied by the spring part 14, which is between the outside diameter of the packing rings and the inside diameter of the stuffing box. This fluid pressure commonly creates great and excessive forces, which force the segmental parts of common packing rings into the surface of the rod, thereby generating excessive friction resulting in heat and wear. In my invention, however, a partial balance of the forces created by the fluid in the area of 14 is obtained by the forces created by the fluids in the area 13, thereby greatly reducing the net resulting forces which act to force the inside surface of the packing ring contact with the outer surface of the rod, thus the friction between these two parts is greatly reduced along with the resultant heat and wear.

Figure 3:
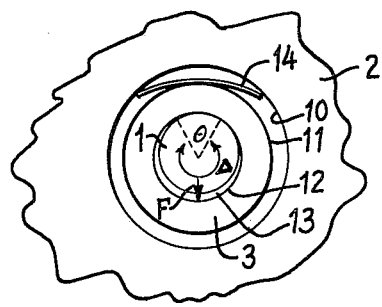
FIG. 3 is an exaggerated view of one of the packing rings.

In accordance with one embodiment of the present invention, use is made of this normally undesirable radial outward force to provide an improved packing ring. Referring to FIG. 3, there is shown in exaggerated form one of the four rings, for example ring 3. Ring 3 has an inner circumference large enough to permit passage of the ring 3 over the circular shaft 1. As shown in FIG. 3, the channel 10 which is formed in the packing box 2, to accommodate the ring, is of a larger diameter than the outer diameter of the ring 3. In the embodiment of FIG. 3, the outer circumference of the ring 3 is shown to have a uniform dimension, that is, it is circular. However, the inner surface of each ring has a first radius over a given chord angle equal to the radius of the piston rod 1. Over the remaining chord angle Δ the inner surface of the ring has a radius which is larger than the radius of rod 1. Thus there exists essentially a crescent shaped opening 13 between the rod and the inner surface 12 of the ring 3. A spring 14 of, for example, stainless steel, forces the inner surface of the ring 3 defined by the chord angle θ into intimate pressure sealing contact with the abutting surface of the piston rod 1. Under these conditions, any leakage fluid passing axially along the rod 1 through the crescent shaped opening 13 causes a force shown as F to be developed. This force F is in the direction which effectively forces the portion of the inner surface of ring 3 defined by the chord angle θ into pressure sealing contact with the abutting portion of the piston rod surface, this being accomplished by the force F applying pressure against that portion of the inner surface of ring 3 defined by the chord angle Δ to separate it from rod 1. It is seen, therefore, that the spring 14 has the primary function of establishing the initial intimate contact between the inner surface of ring 3 defined by the chord angle θ into intimate contact with the abutting surface of the piston rod 1, but that thereafter force F developed by the leakage fluid maintains this intimate contact. It is this force, developed at high pressures, which results in the improved sealing action permitted by the present invention. The force F as previously described could never result in forces as great as those forces utilized in popular current designs of floating metal packing, wherein the total fluid pressure in position designated by number 10 is utilized for force segmental rings against the rod. The present invention balances the total forces in position 10, due to the rings 3–6 being constructed of materials of sufficient mechanical strength to adequately resist those forces tending to collapse the ring radially inward toward the rod.

It is obvious that the use of a single ring as shown in FIG. 3 is insufficient to provide sealing action completely around the surface of the rod 1. Accordingly, a plurality of rings are employed.

Figure 2:
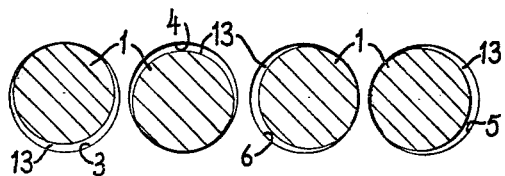
Figure 7:
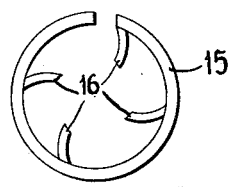
FIG. 7 illustrates the arrangement illustrated in FIG. 5 positioned to be used to hold the rings against the rod or shaft.
Figure 6:
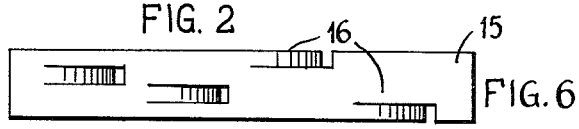
FIG. 6 illustrates another view of FIG. 5.

Returning to FIG. 2, there is shown one embodiment of the present invention employing a series of four rings. In order to simplify the explanation, FIG. 2 only illustrates the positioning of the inner surface or inner diameter of the respective rings 3–6 with respect to piston rod 1. Each of the inner surfaces is shown having a portion defined by a chord angle which has a radius substantially equal to the radius of the piston rod 1. The remaining portion of each inner surface is shown to have a radius somewhat larger than the radius of the rod 1. Use is made of heavy lining to indicate the relative locations of the portions of such inner surfaces that have a radius equal to the radius of the piston rod. In the arrangement of FIG. 2 and reading from left to right, the equal radius portions are shown to occur at zero degrees, 180 degrees, 90 degrees, and 270 degrees. If the heavy lining portions are superimposed over one another in the axial direction of piston rod 1, it is seen that they overlap and completely cover the circumference of the piston rod. Thus, any leakage of fluid passing axially along the piston rod drives the inner surfaces of the successive rings so that the set of packing rings provides an intimate sealing action completely surrounding the circumference of the piston rod. The result is a mechanical packing which responds to leakage fluid pressure to provide a very satisfactory sealing action, even under extremely high pressures.

It is understood that the two circles above-mentioned, which comprise the inner surface of any one of the respective rings 3–6 and which have been described as having differing radii, are joined together by arcs to form an irregular circular shape with a smoothly rounded circumference.

Figure 4:
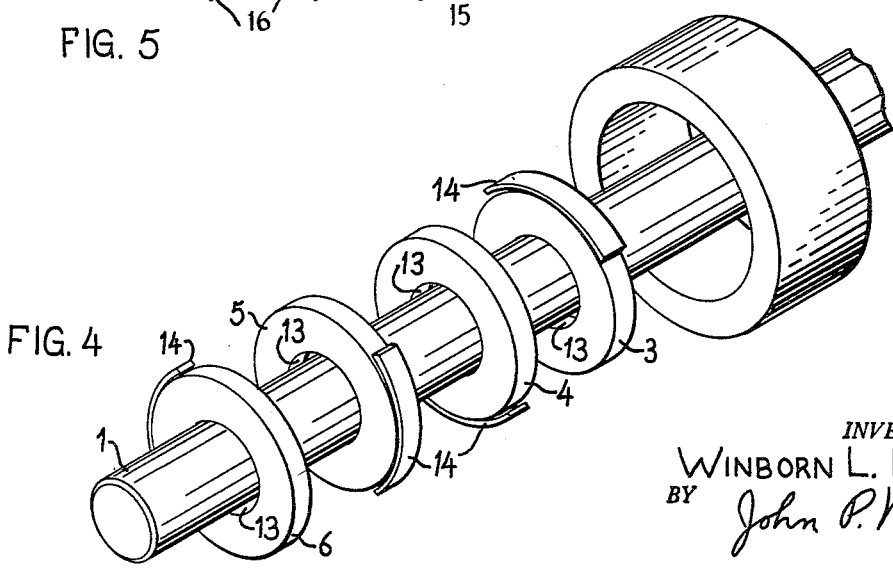
FIG. 4 illustrates essentially, in exploded view form, the manner in which the various rings are located on the moving rod or shaft.

Referring to FIG. 4, there is shown in exploded form the several mechanical packing rings 3–6 having inner surfaces oriented and additionally positioned by respective springs 14 to intimately contact the rod 1 until forces resulting from leakage fluid pressure passing through the effectively crescent shaped opening take over and maintain the sealing contact necessary to minimize leakage of fluid beyond the packing set.

Figure 5:
FIG. 5 illustrates an arrangement for holding the rings under spring pressure against the rod or shaft, this arrangement being here shown as a flat portion.

While FIG. 4 illustrates one form of spring construction, it is obvious that other forms may be resorted to without departing from the spirit of the present invention. For example, FIG. 5 illustrates an arrangement in which the rings are notched for the springs. This arrangement eliminates the need for keying each of the rings 3–6 and the need for separately attaching the springs.

Furthermore, whereas the invention has been described as involving the use of four springs, it is obvious that a different number of rings, either more or less, could be employed to affect the desired sealing action under different operating requirements. It is only sufficient that the rings be mounted on the rod in pressure sealed abutting relationship and angularly oriented about the rod so that the portions of the inner surfaces of the rings which have a radius over a given chord angle equal to the radius of said rod completely encircle the circumference of said rods.

The working surface of the rings should conform as accurately as possible to that of the sliding member of rod 1, or should achieve this condition within a reasonable time after the sealed members have started to operate. Furthermore, the ring should be composed of material that will not damage the sliding member during the process of wearing into a fitting condition and should be capable of withstanding without injury the heat resulting from packing friction. The material of the packing ring should also be free of contamination or attack by the fluid being packed, and should be sufficiently rigid so that it does not seize the piston rod 1 during operation but permits sliding contact with minimum friction.

The rings of the present invention can and will be made of any of the materials of construction currently being utilized for the manufacture of floating metal packings or floating mechanical packings. Such materials would include ferrous metal, non ferrous metals, plastics and modified plastics. The near substitution of a new or previously unused material or combination of materials of construction should not be considered as an improvement on the principles of the present invention, for it is the intent of the inventor to utilize any or all existing known materials or new material, if such materials should offer improved wear properties, strength, heat resistance, or other properties that would render it suitable for use in the present invention.

For purposes of illustration, a solid packing ring and a reciprocating shaft were shown. It should be understood that the principles of this invention are also applicable to split packing rings, piston rings, and rotating shafts.

While the principles of the invention have now been made clear, there will be immediately obvious to those skilled in the art many modifications in structure, arrangement, proportions, elements, and components used in the practice of the invention, and otherwise, which are particularly adapted for specific environments and operating requirements, without departing from those principles. The appended claims are therefore intended to cover and embrace any such modifications within the limits of the true spirit and scope of the invention.

It is claimed:

1. A mechanical packing set adapted to respond to fluid pressure for sealing said packing set to a rod of circular cross-section comprising a plurality of rings, each of said rings having an inner surface of sufficient size to pass said rod, said inner surface of each ring having a first radius over a given chord angle equal to the radius of said rod, and a second radius over the remaining chord angle which is larger than said rod radius, said rings being mounted on said rod in pressure seal abutting relationship and angularly oriented about said rod so that said inner surfaces of said first radius completely encircle the circumference of said rod, said rings when so mounted having their inner surfaces of said second radius adapted to respond to fluid pressure developed between said second radius inner faces and the adjoining rod surfaces to force said inner surfaces of first radius into pressure seal contact with said rod.

2. A mechanical packing set adapted to respond to fluid pressure for sealing said packing set to a moving part comprising a plurality of solid discs, each of said discs having a completely enclosed inner opening of sufficient size to pass said part, the inner opening of each disc having a first portion of its periphery dimensioned to conform substantially exactly to a corresponding portion of the periphery of said part and said inner opening of each disc having a second portion of its periphery dimensioned to be substantially larger than the corresponding remaining periphery of said part, said discs being mounted on said part in pressure seal abutting relationship and angularly oriented about said part so that said first portions of said discs completely surround said part, said discs when so mounted having their inner surfaces corresponding to said second portions adapted to respond to fluid pressure developed between said last named surfaces and the adjoining part surfaces to force said inner surfaces corresponding to said first portions into pressure seal contact with said part.

3. A mechanical packing set adapted to respond to fluid pressure for sealing said packing set to a moving rod of circular cross-section comprising four solid rings, each of said rings having inner opening surfaces of sufficient size to pass said rod, a continuous portion of the periphery of said inner surface of each ring having a first radius substantially equal to the radius of said rod and a radius over the remaining periphery which is larger than said rod radius, said rings being mounted on said rod in pressure seal abutting relationship and angularly oriented about said rod so that the bisectors of the peripheral inner surfaces having said first radius occur substantially at zero degree, 90 degree, 180 degree, and 270 degree points around the circumference of said rod, said rings, when so mounted, adapted to respond to fluid pressure developed between said larger radial inner surfaces and the adjoining rod surfaces to force said peripheral inner surfaces having said first radius into pressure seal contact with said rod.

4. A mechanical packing set adapted to respond to fluid pressure for sealing packing set to a moving rod of circular cross-section comprising four solid rings, each of said rings having inner opening surfaces of sufficient radii to pass said rod, a continuous portion of the periphery of said inner surface of each ring having a first radius substantially equal to the radius of said rod and a radius over the remaining periphery which is larger than said rod radius, said rings being mounted on said rod in pressure seal abutting relationship and angularly oriented about said rod so that said portions of said inner surfaces overlap one another and thereby surround the circumference of said rod, said rings, when so mounted, adapted to respond to fluid pressure developed between said larger radial inner surfaces and the adjoining rod surfaces to force said portions of said inner surfaces into pressure seal contact with said rod.

5. A mechanical packing set adapted to respond to fluid pressure for sealing said packing set to a moving rod of circular cross-section comprising four solid rings, each of said rings having inner opening surfaces of sufficient radii to pass said rod, a continuous portion of the periphery of said inner surface of each ring having a first radius substantially equal to the radius of said rod, and a radius over the remaining periphery which is larger than said rod radius, said rings being mounted on said rod in pressure seal abutting relationship and angularly oriented about said rod so that the bisectors of the peripheral inner surfaces having said first radius occur substantially at zero degree, 90 degree, 180 degree, and 270 degree points around the circumference of said rod, spring means acting on each of said rings for biasing said peripheral inner surfaces having said first radius into intimate contact with the adjoining rod surfaces, said rings when so mounted adapted to respond to fluid pressure developed between said larger radial inner surfaces and the adjoining rod surfaces to maintain said peripheral inner surfaces having said first radius in pressure seal contact with said rod.

References Cited in the file of this patent
UNITED STATES PATENTS

| | | |
|---|---|---|
| 1,831,674 | Lindgren | Nov. 10, 1931 |
| 1,891,436 | Mitchell | Dec. 20, 1932 |
| 2,172,141 | King | Sept. 5, 1939 |